(12) United States Patent
Biet et al.

(10) Patent No.: US 7,298,466 B2
(45) Date of Patent: Nov. 20, 2007

(54) SYSTEM AND METHOD FOR ASSEMBLING OPTICAL COMPONENTS

(75) Inventors: Michel Biet, Antony (FR); Gilles Ughetto, Rambouillet (FR); Laurent Lievre, Lardy (FR); Jerome Felsemberg, Boissy sous Saint Yon (FR)

(73) Assignee: Avanex Corporation, Fremont, CA (US)

( * ) Notice: Subject to any disclaimer, the term of this patent is extended or adjusted under 35 U.S.C. 154(b) by 170 days.

(21) Appl. No.: 11/081,926

(22) Filed: Mar. 15, 2005

(65) Prior Publication Data

US 2006/0209297 A1    Sep. 21, 2006

(51) Int. Cl.
    G01B 11/26    (2006.01)
(52) U.S. Cl. .................................... 356/138
(58) Field of Classification Search ............... 356/138, 356/153
    See application file for complete search history.

(56) References Cited

U.S. PATENT DOCUMENTS 4,850,668 A * 7/1989 Hakimi ..................... 385/134
5,666,450 A * 9/1997 Fujimura et al. ............. 385/93
5,859,947 A * 1/1999 Kiryuscheva et al. ....... 385/136
2002/0033941 A1* 3/2002 Seward ....................... 356/153

* cited by examiner

Primary Examiner—Tarifur Chowdhury
Assistant Examiner—Isiaka O Akanbi
(74) Attorney, Agent, or Firm—Patterson & Sheridan, LLP (57) ABSTRACT

The proposed solution to the problems associated with assembling optical components introduces an angular alignment step and the use of collimated optical beams to the assembly process. One embodiment of a method for aligning optical components includes the steps of angularly aligning a fiber subassembly and a laser subassembly to achieve a desired angular position of the fiber subassembly relative to the laser subassembly, transversely aligning the fiber subassembly and the laser subassembly to achieve a desired linear position of the fiber subassembly relative to the laser subassembly, while maintaining the desired angular position, and installing an intermediate part configured to accommodate the desired angular position and the desired linear position. The method also includes the step of permanently assembling the fiber subassembly, the laser subassembly and the intermediate part, while maintaining the desired angular position and the desired linear position.

21 Claims, 9 Drawing Sheets

SYSTEM AND METHOD FOR ASSEMBLING OPTICAL COMPONENTS

BACKGROUND OF THE INVENTION

1. Field of the Invention

This invention relates generally to fiber optic systems and more particularly to a system and method for assembling optical components.

2. Description of the Background Art

An optical transmission system includes a number of optic components, such as a laser subassembly that contains the optical source (i.e., the laser) and a fiber subassembly that includes a portion of the fiber optic cable, that are coupled together to transmit the optical signal. Certain applications, such as pump modules, require high coupling efficiency between the fiber subassembly and the laser subassembly. To optimize coupling efficiency between these components, five degrees of freedom ideally should be controlled during the assembly process. These five degrees of freedom include of the relative linear positions of the fiber and laser subassemblies in the x, y and z directions (where the z-axis is defined to be the optical axis) and the relative angular positions of the fiber and laser subassemblies in the $\Theta_x$ and $\Theta_y$ directions.

Current assembly techniques do not control all five degrees of freedom. For example, direct coupling typically controls only three degrees of freedom, namely, the relative linear position of the fiber and laser subassemblies in the x, y and z directions. Such an approach results in a certain amount of angular misalignment between the fiber and laser subassemblies, leading to sub-optimal coupling efficiency. To increase coupling efficiency with current techniques, the transverse (i.e., linear) tolerances of the optic components must be very tight to reduce the amount of angular misalignment. Requiring tight tolerances substantially increases the complexity and cost of the assembly process.

Another drawback of current assembly techniques is that the distance between the fiber and laser subassemblies is purposefully kept short to reduce the amount of angular misalignment between the subassemblies. The short distance limits the usefulness of the resulting assembly because there is no free-space propagation path. Further, the short distance precludes inserting isolators, filters and the like between the fiber and laser subassemblies, further limiting the usefulness of the resulting assembly.

Attempts have been made to use coupling lenses to solve the problems described above. However, using coupling lenses also results in complex and costly assembly.

SUMMARY OF THE INVENTION

The proposed solution to the problems associated with assembling optical components introduces an angular alignment step and the use of collimated optical beams to the assembly process. One embodiment of a method for aligning optical components includes the steps of angularly aligning a fiber subassembly and a laser subassembly to achieve a desired angular position of the fiber subassembly relative to the laser subassembly, transversely aligning the fiber subassembly and the laser subassembly to achieve a desired linear position of the fiber subassembly relative to the laser subassembly, while maintaining the desired angular position, and installing an intermediate part configured to accommodate the desired angular position and the desired linear position. The method also includes the step of permanently assembling the fiber subassembly, the laser subassembly and the intermediate part, while maintaining the desired angular position and the desired linear position.

One advantage of the disclosed system and method is that relative angular position between the laser subassembly and the fiber subassembly may be controlled in the $\Theta_x$ and $\Theta_y$ directions. This control along with using a collimated beam (produced by the laser subassembly) enables high coupling efficiency between the laser subassembly and the fiber subassembly without requiring tight transverse tolerances in the individual optical components or the use of bulk lenses for coupling. Allowing relaxed transverse tolerances reduces the complexity and cost of assembly. In addition, using a collimated beam enables the distance between the laser subassembly and the fiber subassembly to be increased, without impairing coupling efficiency, thereby creating space for a free-space propagation path and/or for inserting isolators, filters and the like.

DETAILED DESCRIPTION OF THE INVENTION

Figure 1:
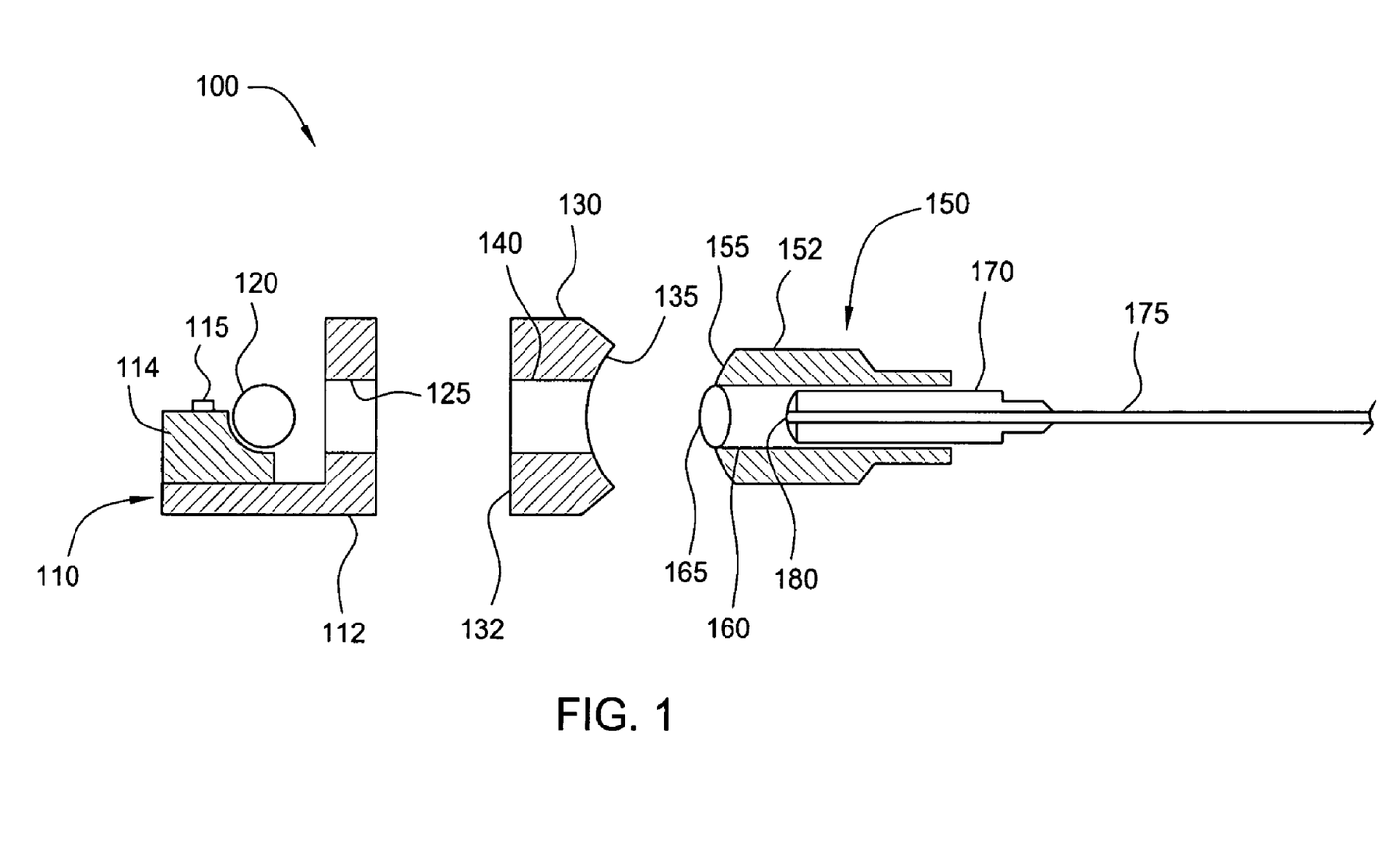
FIG. 1 illustrates a set of fiber optic components that may be assembled in accordance with the principles of the present invention.

FIG. 1 illustrates a set of fiber optic components 100 that may be assembled in accordance with the principles of the present invention. As shown, set of fiber optic components 100 includes, without limitation, a laser subassembly 110, an intermediate piece 130 and a fiber subassembly 150. Laser subassembly 110 includes, without limitation, an L-shaped base 112, upon which an optical source 114 is mounted, and a collimating lens 120. Optical source 114 includes a laser 115, which is configured to emit a source beam that passes through collimating lens 120. As described in further detail herein, collimating lens 120 enlarges the diameter of the source beam to produce a collimated beam that enlarges transverse tolerances while ensuring good optical coupling between laser subassembly 110 and fiber subassembly 150.

L-shaped base 112 contains an aperture 125 that allows the collimated beam to pass through L-shaped base 112 unimpeded.

Intermediate part 130 is a cylindrically-shaped piece having a substantially flat surface 132 at an end nearest laser subassembly 110 and a spherically-shaped concave surface 135 at an end nearest fiber subassembly 150. As described in further detail herein, intermediate part 130 is configured to accommodate the angular position of fiber subassembly 150 relative to that of laser subassembly 110. Intermediate part 130 also contains an aperture 140 that allows the collimated beam produced by laser subassembly 110 to pass through intermediate part 130 to fiber subassembly 150 unimpeded.

Fiber subassembly 150 includes an outer element 152 with a defined passageway 160, a focusing lens 165, a ferrule 170 and a fiber 175. Focusing lens 165 is coupled to outer element 152 at an end of fiber subassembly 150 nearest intermediate part 130, and ferrule 170 is partially disposed within passageway 160 at an opposite end of fiber subassembly 150. Ferrule 170 supports fiber 175, fixing the position of fiber 175 within fiber subassembly 150. Focusing lens 165 is configured to focus the collimated beam produced by laser subassembly 110 onto a tip 180 of fiber 175. Focusing lens 165 is further configured to fit within aperture 140 when fiber subassembly 150 is coupled to intermediate part 130. In alternative embodiments, focusing lens 165 may be disposed farther within passageway 160 to reduce the risk of focusing lens 165 contacting concave surface 135 when fiber subassembly 150 is coupled to intermediate part 130. In addition to the foregoing, outer element 152 has a spherically-shaped convex surface 155 at an end nearest intermediate part 130. Importantly, convex surface 155 is configured to mate with concave surface 135 of intermediate part 130 to form a ball joint. As described in further detail herein, this ball joint configuration enables intermediate part 130 to accommodate the angular position of fiber subassembly 150 relative to that of laser subassembly 110.

FIGS. 2A through 4 describe steps for assembling laser subassembly 110, intermediate part 130 and fiber subassembly 150 in accordance with the principles of the present invention.

Figure 2A:
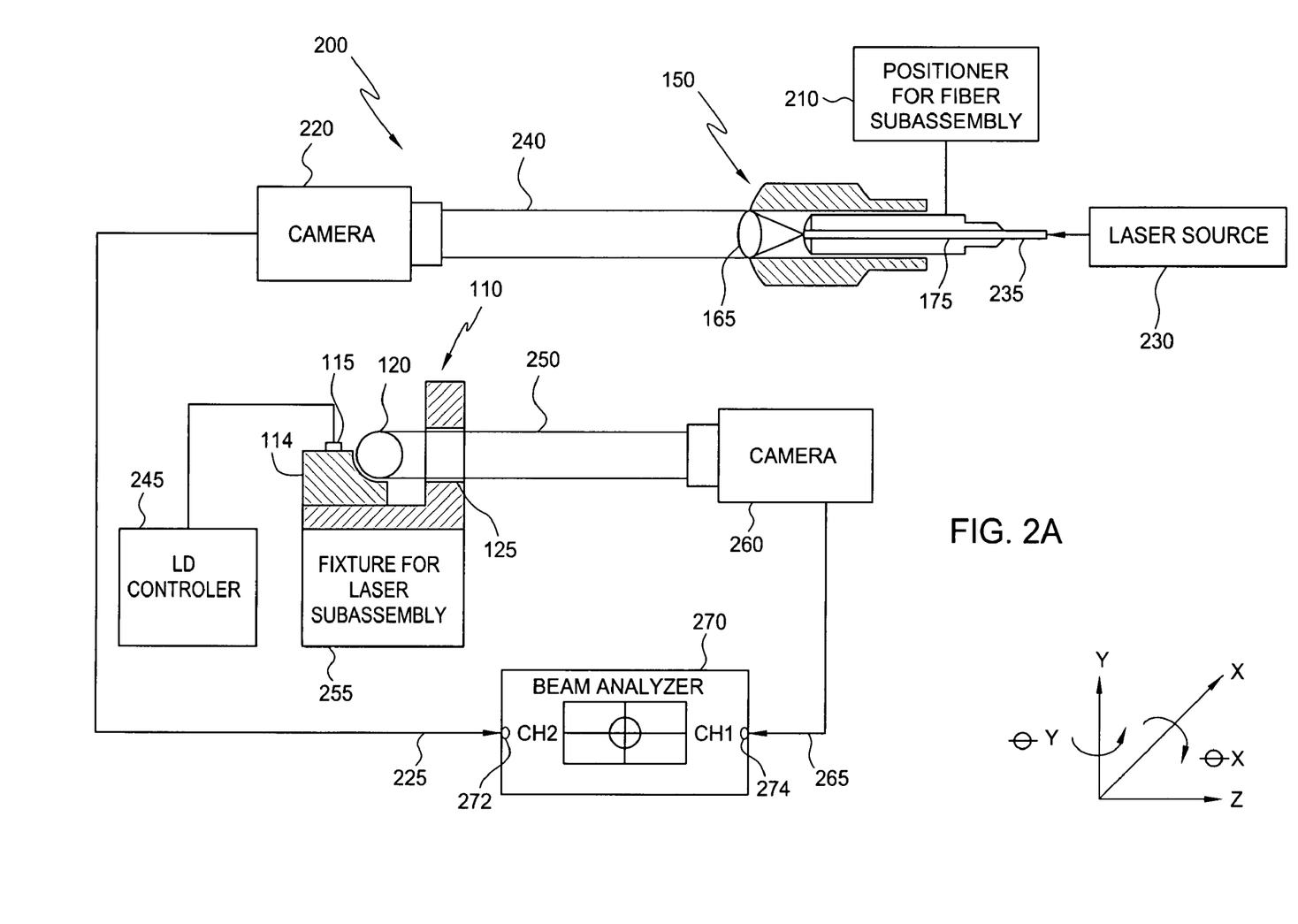
FIG. 2A illustrates a system for angularly aligning the laser subassembly and the fiber subassembly of FIG. 1, according to one embodiment of the present invention.

FIG. 2A illustrates a system 200 for angularly aligning the laser subassembly 110 and the fiber subassembly 150 of FIG. 1, according to one embodiment of the present invention. Laser subassembly 110 is attached to a fixture 255 to fix the position of laser subassembly 110 during the assembly process. Laser source 114, which is controlled by a laser controller 245, directs a laser beam towards collimating lens 120 to produce a collimated beam 250. Collimated beam 250 passes through aperture 125 to a camera 260. Camera 260 detects collimated beam 250 and outputs a signal 265 to a channel 274 of beam analyzer 270 that corresponds to collimated beam 250.

Fiber subassembly 150 is coupled to a positioner 210 that is configured to adjust the angular and transverse positions of fiber subassembly 150. A laser source 230, which is optically coupled to an output end 235 of fiber 175, directs a laser beam into output end 235. Upon emerging from fiber 175, the laser beam is collimated by focusing lens 165 to produce a collimated beam 240 that is directed to a camera 220. Camera 220 detects collimated beam 240 and outputs a signal 225 to a channel 272 of beam analyzer 270 that corresponds to collimated beam 240.

Beam analyzer 270 is configured to measure the angular displacements of collimated beam 240 relative to collimated beam 250 in the $\Theta_x$ and $\Theta_y$ directions based on signals 225 and 265 received from cameras 220 and 260, respectively. Positioner 210 is configured to adjust the angular position of fiber subassembly 150 in the $\Theta_x$ and $\Theta_y$ directions until collimated beam 240 and collimated 250 are substantially parallel to one another (i.e., until the angular displacements of collimated beam 240 relative to collimated beam 250 in the $\Theta_x$ and $\Theta_y$ directions are substantially zero).

Beam analyzer 270 may be any type of well-known beam analyzing device, such as the Photon, Inc. PS 2315 optical analyzer, or other device configured with similar functionality. Likewise, positioner 210 may be any type of well-known positioning device, such as the Thorlabs, Inc. APT 600 family of 6-axis positioners, or other device configured with similar functionality.

In an alternate embodiment of the invention, the position of fiber subassembly 150 may be fixed and angular alignment may be accomplished by adjusting the angular orientation of laser subassembly 110 relative to fiber subassembly 150 using positioner 210. In yet another embodiment of the invention, each of laser subassembly 110 and fiber subassembly 150 may be coupled to a positioner and angular alignment may achieved by adjusting the angular orientations of both subassemblies.

Figure 2B:
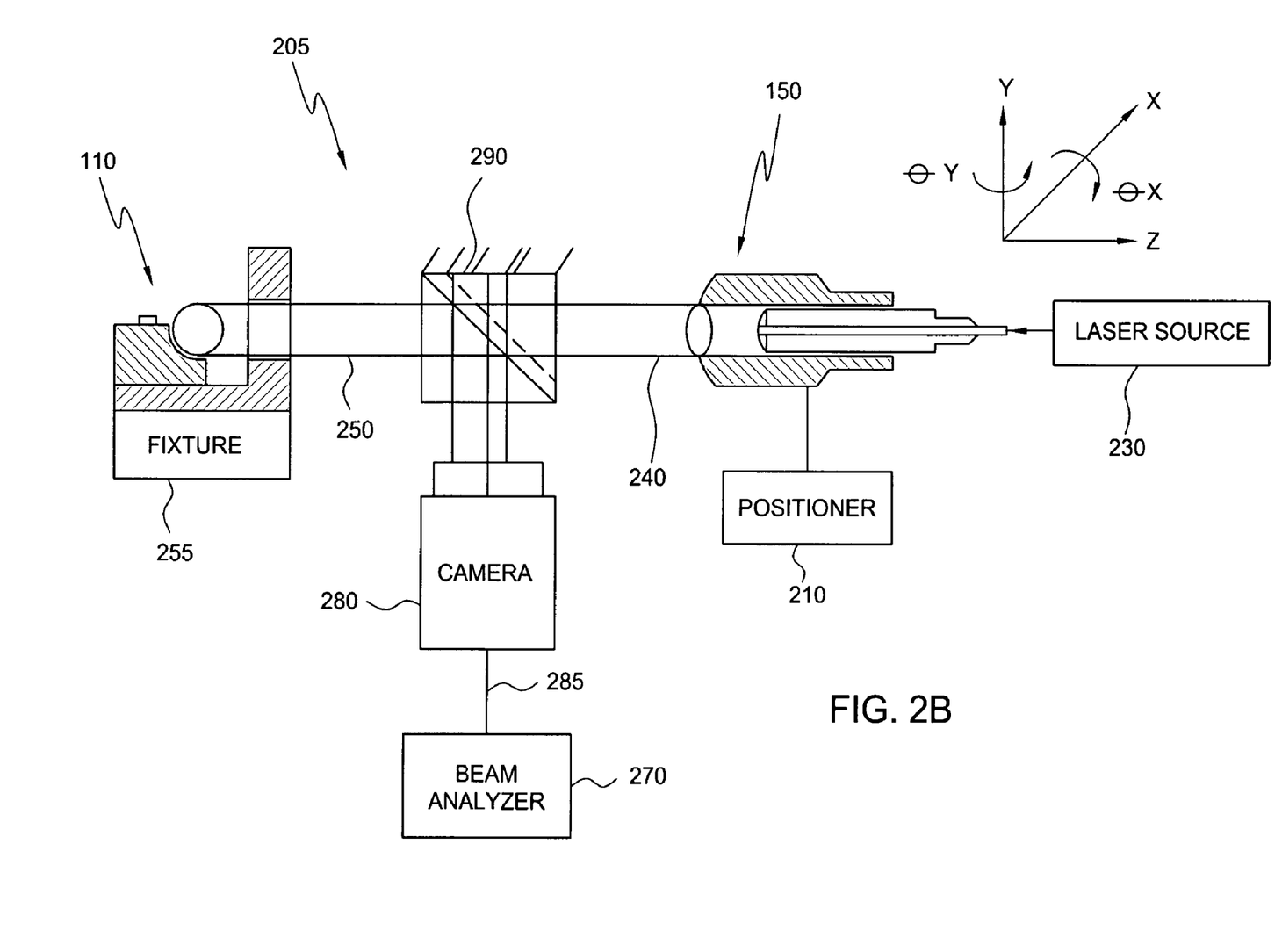
FIG. 2B illustrates a system for angularly aligning the laser subassembly and the fiber subassembly of FIG. 1, according to another embodiment of the present invention.

FIG. 2B illustrates a system 205 for angularly aligning the laser subassembly 110 and the fiber subassembly 150 of FIG. 1, according to an alternative embodiment of the present invention. As shown, a beam splitter 290 may be used to toggle the input to a camera 280 such that camera 280 receives either collimated beam 250 from laser subassembly 110 or collimated beam 240 from fiber subassembly 150. Camera 280 detects collimated beam 250 and outputs a signal to beam analyzer 270 that corresponds to collimated beam 250 or detects collimated beam 240 and outputs signal 285 to beam analyzer 270 that corresponds to collimated beam 240. Beam analyzer 270 is configured to measure the angular displacements of collimated beam 240 relative to collimated beam 250 in the $\Theta_x$ and $\Theta_y$ directions based on signals 285 received from camera 280. Positioner 210, which is coupled to fiber subassembly 150, is configured to adjust the angular position of fiber subassembly 150 in the $\Theta_x$ and $\Theta_y$ directions until collimated beam 240 and collimated 250 are substantially parallel to one another (i.e., until the angular displacements of collimated beam 240 relative to collimated beam 250 in the $\Theta_x$ and $\Theta_y$ directions are substantially zero). As before, in alternative embodiments, a positioner may be used to adjust the angular orientation of laser subassembly 110, as opposed to that of fiber subassembly 150, or the angular orientations of both laser subassembly 110 and fiber subassembly 150 may be adjusted with respective positioners.

Figure 3A:
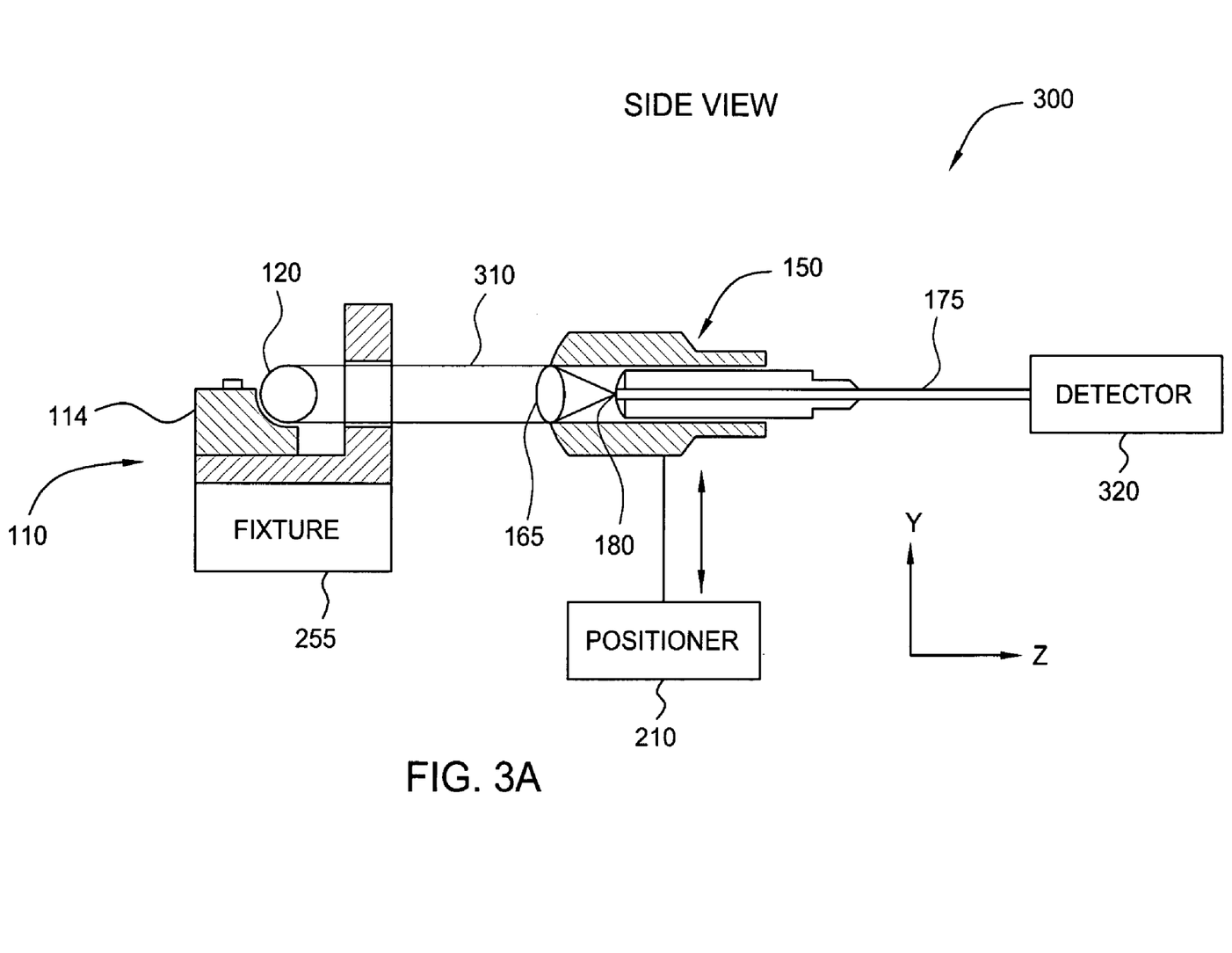
FIGS. 3A and 3B illustrate a system for transversely aligning the laser subassembly and the fiber subassembly of FIG. 1, according to one embodiment of the present invention.
Figure 3B:
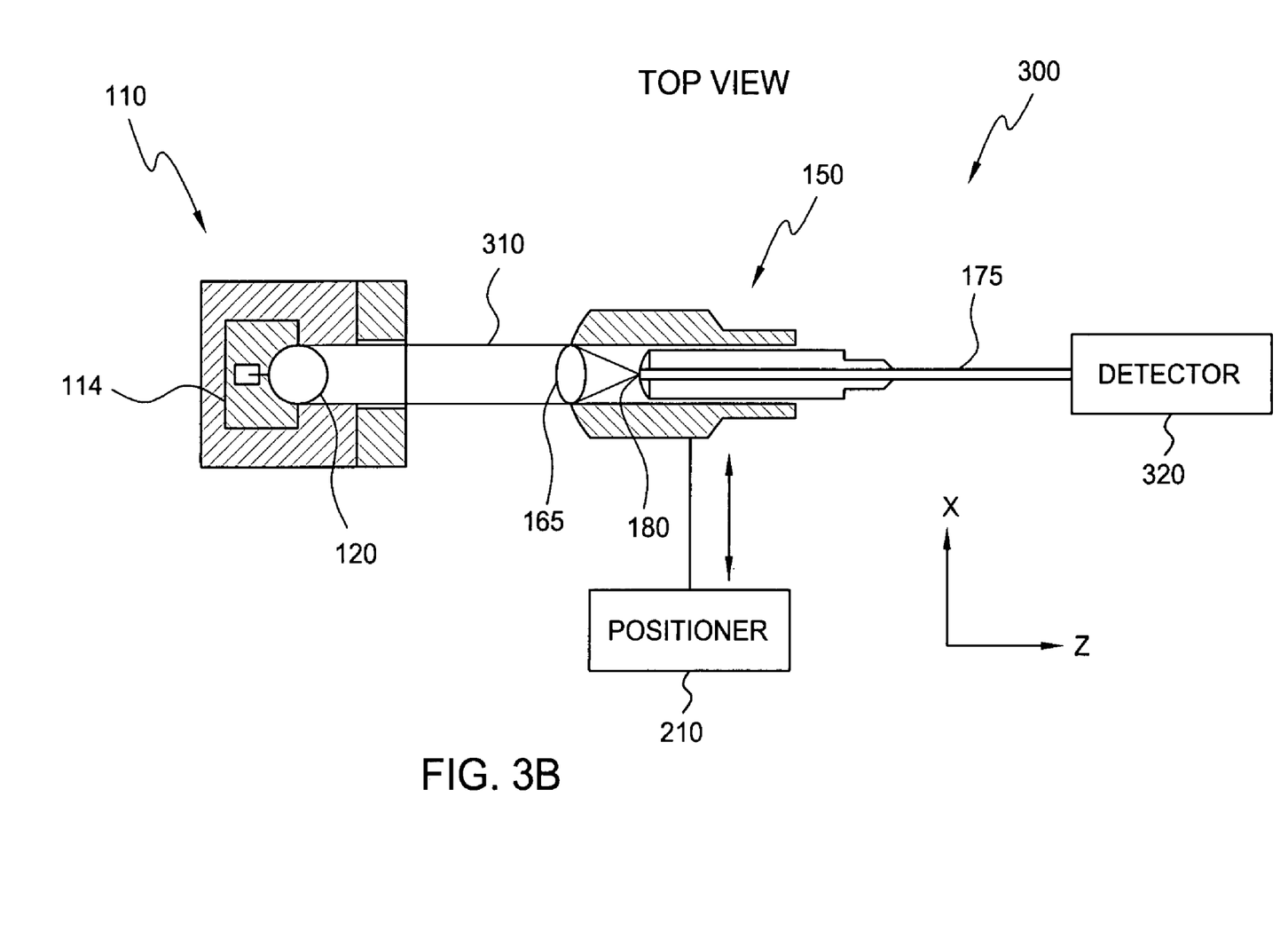

FIGS. 3A and 3B illustrate a system 300 for transversely aligning laser subassembly 110 and fiber subassembly 150 of FIG. 1, according to one embodiment of the present invention. An "active alignment" technique is used for this step. As shown, laser source 114 of laser subsystem 110 emits a laser beam that is collimated by collimating lens 120 to increase the diameter of the laser beam. Increasing the diameter facilitates transverse alignment of laser subassembly 110 and fiber subassembly 150 because a laser beam with a larger diameter can more easily intercept focusing lens 165 of fiber subassembly 150 than a laser beam with a smaller diameter. Resulting collimated beam 310 is incident on focusing lens 165, which focuses collimated beam 310 on tip 180 of fiber 175. A detector 320 is coupled to fiber 175 and is configured to measure optical signal power transmitted through fiber 175. Positioner 210, which is coupled to fiber subassembly 150, is configured to adjust the position of fiber subassembly 150 relative to laser subassembly 110 in the x and y directions to maximize the power measured by detector 320. Importantly, when adjusting the position in the x and y directions, positioner 210 maintains the angular position of fiber subassembly 150 relative to laser subassembly 110 resulting from the angular alignment step described above.

FIG. 3A is a side view showing the position of fiber subassembly 150 being adjusted in the y-direction, and FIG. 3B is a top view showing the position of fiber subassembly 150 being adjusted in the x-direction. In both FIGS. 3A and 3B, laser subassembly 110 is attached to fixture 255 and the position of fiber subassembly 150 in the x and y directions is adjusted. In an alternative embodiment of the invention, the position of fiber subassembly 150 may be fixed and transverse alignment may be accomplished by adjusting the position of laser subassembly 110 relative to fiber subassembly 150 in the x and y directions using positioner 210. In yet another embodiment of the invention, each of laser subassembly 110 and fiber subassembly 150 may be coupled to a positioner and transverse alignment may be achieved by adjusting the positions of both subassemblies in the x and y directions. Persons skilled in the art will recognize that these alternative embodiments also apply to the step described below in conjunction with FIG. 4.

FIGS. 3A and 3B illustrate a system 300 for transversely aligning laser subassembly 110 and fiber subassembly 150 of FIG. 1, according to one embodiment of the present invention. An "active alignment" technique is used for this step. As shown, laser source 114 of laser subsystem 110 emits a laser beam that is collimated by collimating lens 120 to increase the diameter of the laser beam. Increasing the diameter facilitates transverse alignment of laser subassembly 110 and fiber subassembly 150 because a laser beam with a larger diameter can more easily intercept focusing lens 165 of fiber subassembly 150 than a laser beam with a smaller diameter. Resulting collimated beam 310 is incident on focusing lens 165, which focuses collimated beam 310 on tip 180 of fiber 175. A detector 320 is coupled to fiber 175 and is configured to measure optical signal power transmitted through fiber 175. Positioner 210, which is coupled to fiber subassembly 150, is configured to adjust the position of fiber subassembly 150 relative to laser subassembly 110 in the x and y directions to maximize the power measured by detector 320. Importantly, when adjusting the position in the x and y directions, positioner 210 maintains the angular position of fiber subassembly 150 relative to laser subassembly 110 resulting from the angular alignment step described above.

Figure 4:
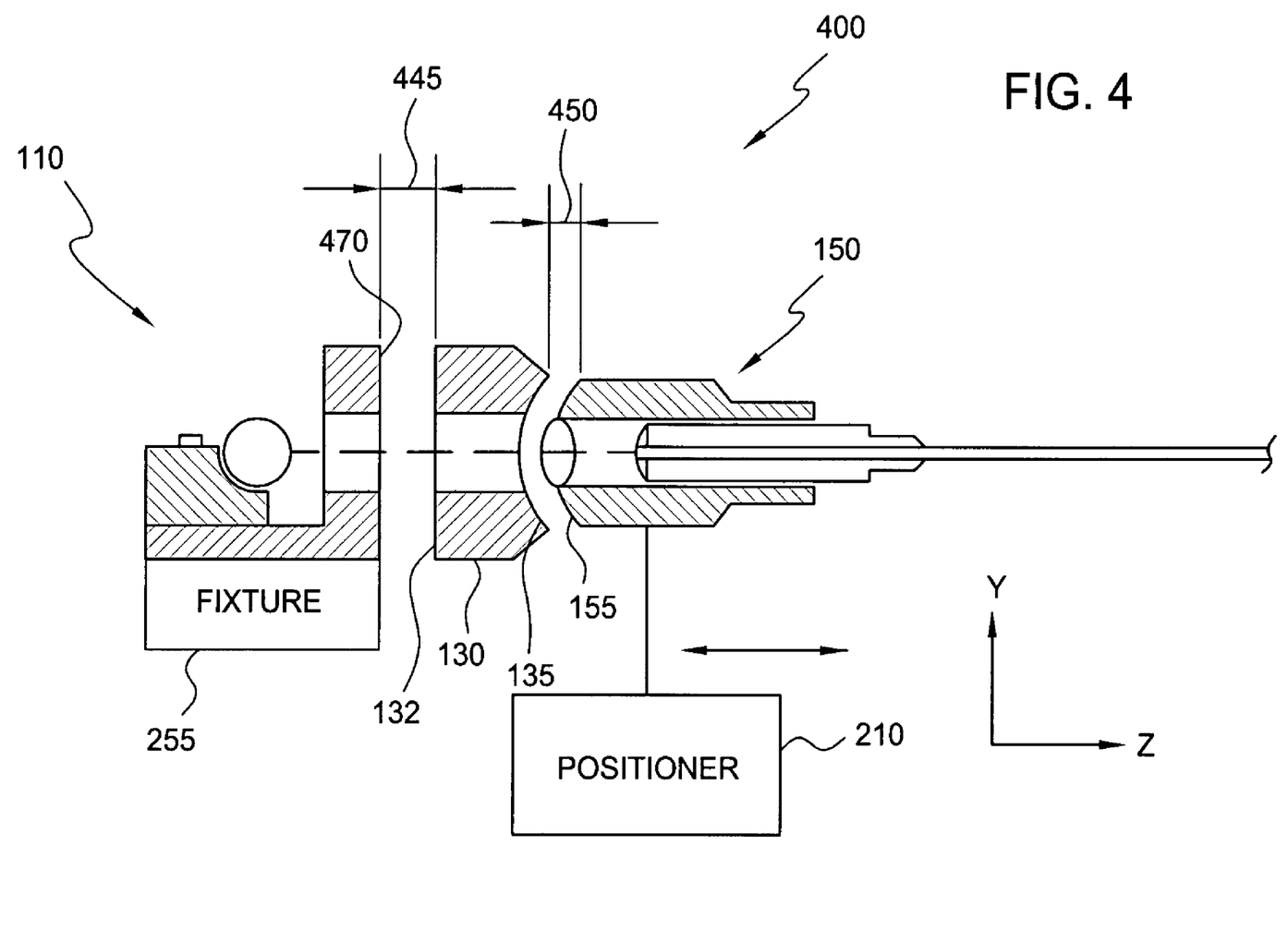
FIG. 4 illustrates a system for coupling the laser subassembly of FIG. 1 to the fiber subassembly of FIG. 1 using an intermediate part, according to one embodiment of the present invention.

Positioner 210 continues adjusting the position of fiber subassembly 150 in the z-direction until intermediate part 130 is in contact with both laser subassembly 110 and fiber subassembly 150. When contact is made with laser subassembly 110, surface 132 of intermediate part 130 mates with a surface 470 of laser subassembly 110 such that aperture 140 of intermediate part 130 aligns with aperture 125 of laser subassembly 110. When contact is made with fiber subassembly 150, concave surface 135 of intermediate part 130 mates with convex surface 155 of fiber subassembly 150 to form a ball socket. Importantly, intermediate part 130 is designed to accommodate the angular and linear positions of fiber subassembly 150 relative to laser subassembly 110 resulting from the angular and transverse alignment steps described above. More specifically, concave surface 135 and convex surface 155 are configured such that the resulting ball joint is able to accommodate the angular position of fiber subassembly 150 relative to laser subassembly 110 resulting from the angular alignment step, and surfaces 132 and 470 are configured to accommodate the linear position of fiber subassembly 150 relative to laser subassembly 110 in the x and y directions resulting from the transverse alignment step.

In addition to the foregoing, intermediate part 130 is configured such that no external tooling is required to maintain the relative positions of laser subassembly 110, intermediate part 130 and fiber subassembly 150 once contact is made between intermediate part 130 and each of laser subassembly 110 and fiber subassembly 150, as described above. YAG welding or some other technically feasible fastening technique is then used to permanently fix intermediate part 130 to each of laser subassembly 110 and intermediate part 130, while maintaining the angular and linear positions of fiber subassembly 150 relative to laser subassembly 110 resulting from the angular and transverse alignment steps described above.

One advantage of the disclosed system and method is that relative angular position between laser subassembly 110 and fiber subassembly 150 may be controlled in the $\Theta_x$ and $\Theta_y$ directions. This control along with using a collimated beam (produced by laser subassembly 110) enables high coupling efficiency between laser subassembly 110 and fiber subassembly 150 without requiring tight transverse tolerances in the individual optical components or the use of bulk lenses for coupling. Allowing relaxed transverse tolerances reduces the complexity and cost of assembly. In addition, more controlled and precise alignment enables the distance between laser subassembly 110 and fiber subassembly 150 to be increased, without impairing coupling efficiency, thereby creating space for a free-space propagation path and/or for inserting isolators, filters and the like.

Figure 5:
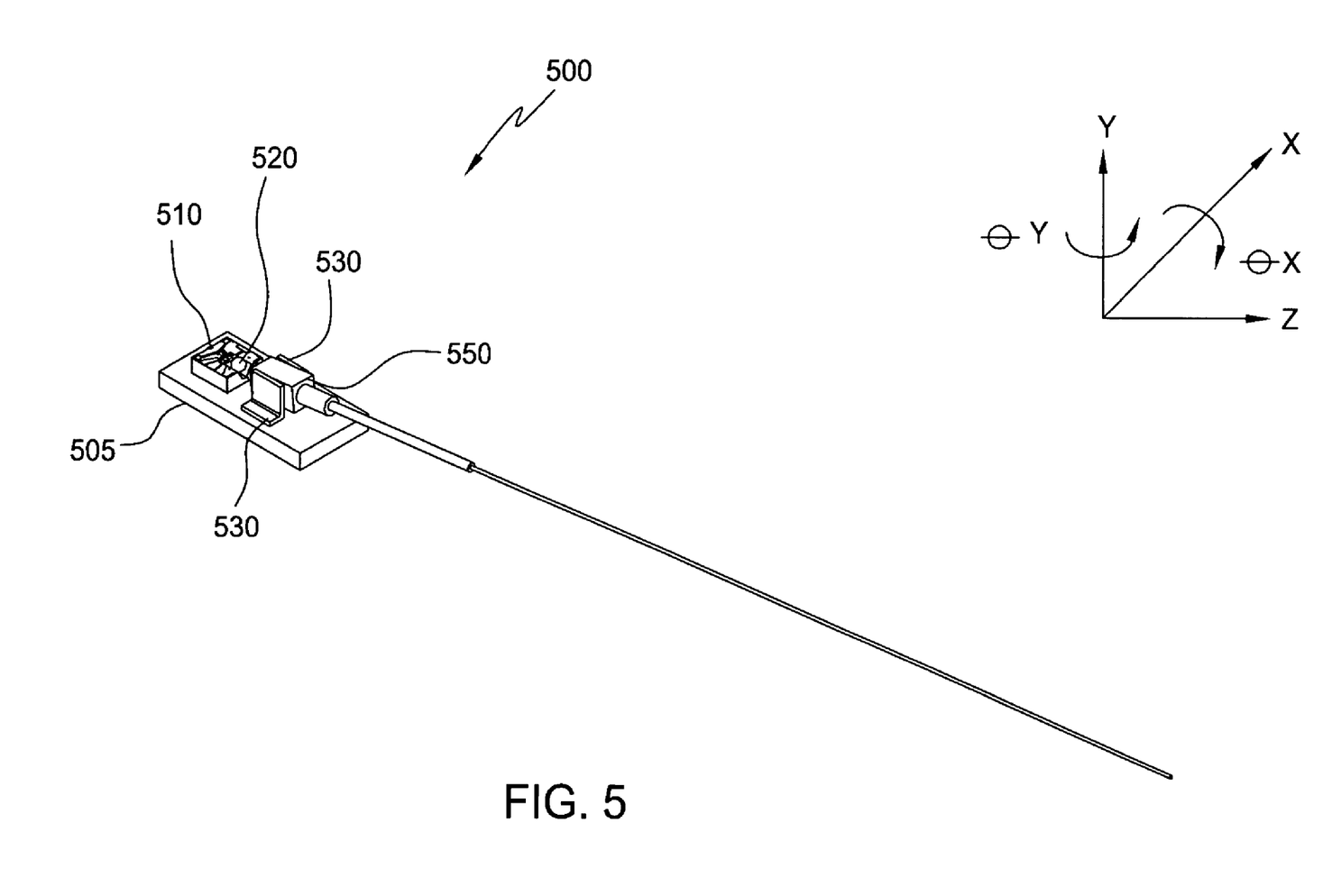
FIG. 5 illustrates another set of fiber optic components that may be assembled in accordance with the principles of the present invention.

The disclosed system and method may be used to assembly any set of optics components similar to set 100 of FIG. 1 so long as the set includes intermediate parts or some other means that are configured to accommodate the angular and linear positions of fiber subassembly 150 relative to laser subassembly 110 resulting from the angular and transverse alignment steps described above. For example, FIG. 5 illustrates another set of fiber optic components 500 that may be assembled in accordance with the principles of the present invention. As described in further detail herein, the assembly process for set of fiber optic components 500 is similar to that described above in conjunction with FIGS. 2-4.

Laser subassembly 510, which is coupled to a base plate 505 is similar to laser subassembly 110 of FIG. 1. Laser subassembly 510 includes a collimating lens 520 for producing a collimated beam, as previously described herein. Fiber subassembly 550 is similar to fiber subassembly 150 of FIG. 1 and includes a focusing lens (not shown) that may be used to produce a collimated beam during the angular alignment step, as previously described herein.

The disclosed system and method may be used to assemble any set of optics components similar to set 100 of FIG. 1 so long as the set includes intermediate parts or some other means that are configured to accommodate the angular and linear positions of fiber subassembly 150 relative to laser subassembly 110 resulting from the angular and transverse alignment steps described above. For example, FIG. 5 illustrates another set of fiber optic components 500 that may be assembled in accordance with the principles of the present invention. As described in further detail herein, the assembly process for set of fiber optic components 500 is similar to that described above in conjunction with FIGS. 2-4.

Figure 6A:
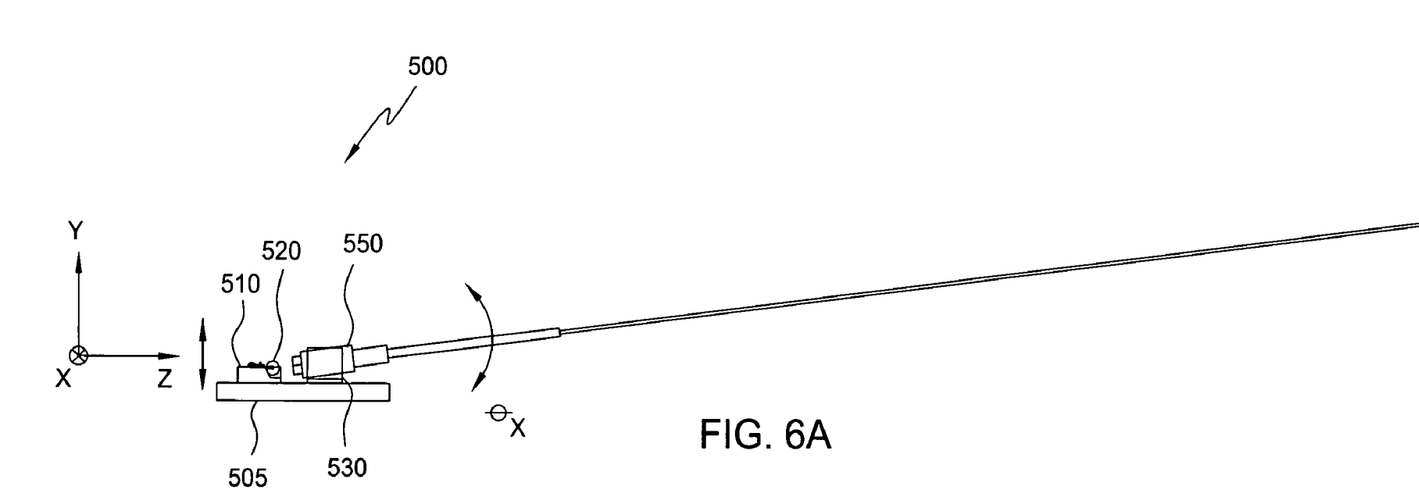
FIGS. 6A and 6B illustrate how the brackets of FIG. 5 accommodate the angular and linear positions of the fiber subassembly relative to laser subassembly resulting from the angular and transverse alignment steps.
Figure 6B:
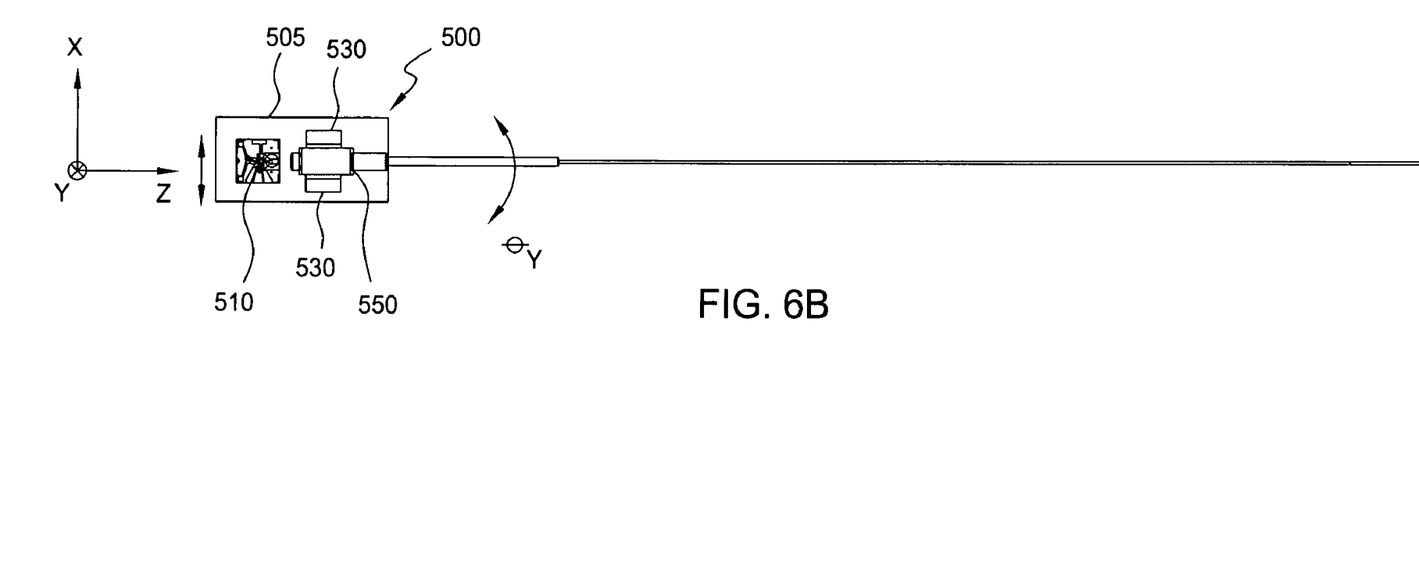

FIGS. 6A and 6B illustrate how brackets 530 of FIG. 5 accommodate the angular and linear positions of fiber subassembly 550 relative to laser subassembly 530 resulting from the angular and transverse alignment steps described above. FIG. 6A shows that fiber subassembly 550 may be rotated about the x-axis relative to brackets 530 to achieve the desired relative angular position of fiber subassembly 550 in the $\Theta_x$ direction. FIG. 6A also shows that fiber subassembly 550 may be moved along the y-axis relative to brackets 530 to achieve the desired relative linear position of fiber subassembly 550 in the y-direction. FIG. 6B shows that fiber subassembly 550 and brackets 530 may be rotated together about the y-axis on the top surface of base plate 505 to achieve the desired relative angular position of fiber subassembly 550 in the $\Theta_y$ direction. FIG. 6B also shows that fiber subassembly 550 and brackets 530 may be moved together along the x-axis on the top surface of base plate 505 to achieve the desired relative linear position of fiber subassembly 550 in the x-direction.

Figure 7:
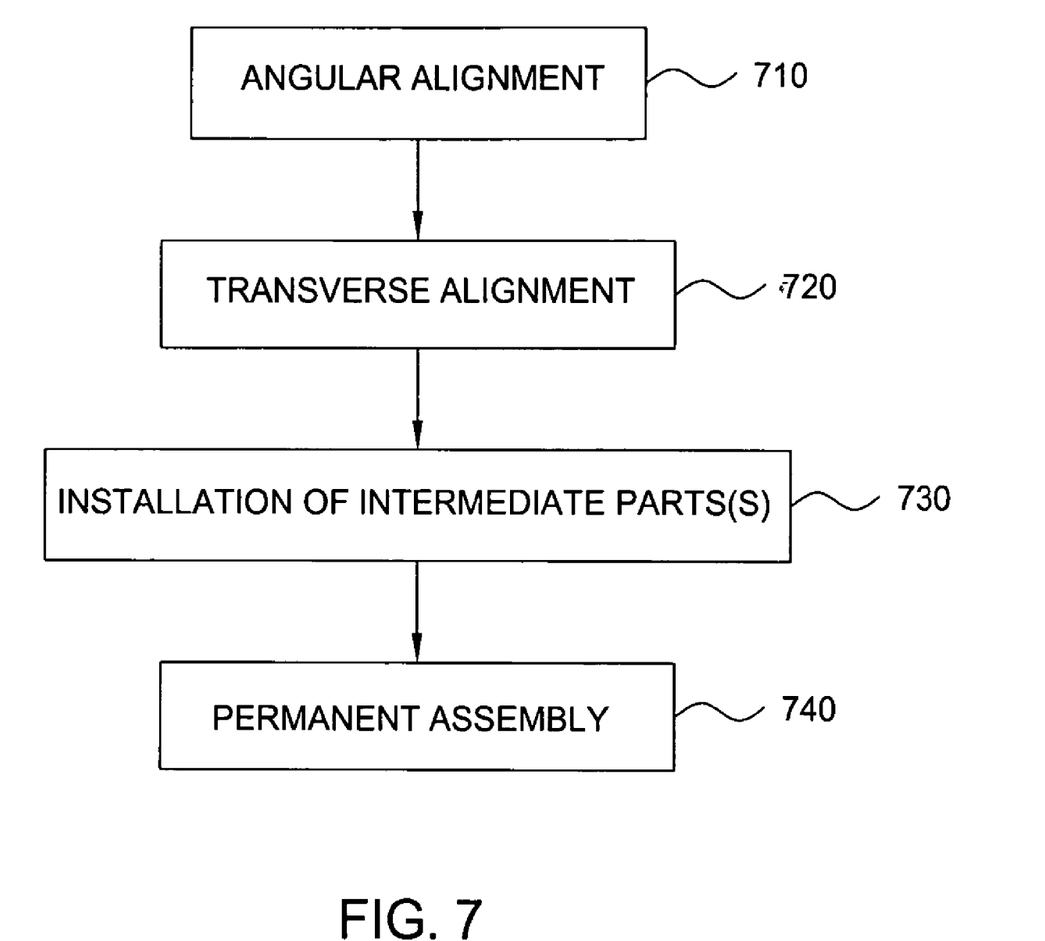
FIG. 7 is a flow diagram of method steps for assembling a set of fiber optic components, according to one embodiment of the present invention.

FIG. 7 is a flow diagram of method steps for assembling a set of fiber optic components, according to one embodiment of the present invention. Although the method steps are described in the context of the systems illustrated in FIGS. 1-6, any system configured to perform the method steps in any order is within the scope of the present invention.

As shown in FIG. 7, the method of assembling starts in step 710 with the angular alignment of the fiber subassembly and the laser subassembly. In one embodiment, a positioner adjusts the angular position of the fiber subassembly in the $\Theta_x$ and $\Theta_y$ directions while a beam analyzer measures the angular displacements of a collimated beam produced by the fiber subassembly relative to a collimated beam produced by the laser subassembly in the $\Theta_x$ and $\Theta_y$ directions. The positioner adjusts the angular position of the fiber subassembly in the $\Theta_x$ and $\Theta_y$ directions the two collimated beams are substantially parallel to one another (i.e., until the angular displacements of the collimated beam produced by the fiber subassembly relative to the collimated beam produced by the laser subassembly in the $\Theta_x$ and $\Theta_y$ directions are substantially zero).

Next, in step 720, the fiber subassembly and the fiber subassembly are transversely aligned. In one embodiment, a collimated beam produced by the laser subassembly is incident on a focusing lens included in the fiber subassembly. The focusing lens focuses the collimated beam on the tip of the fiber included in the fiber subassembly such that a detector that is coupled to the other end of the fiber is able to measure optical signal power transmitted through the fiber. The positioner adjusts the position of the fiber subassembly relative to the laser subassembly in the x and y directions to maximize the power measured by the detector. Importantly, when adjusting the position in the x and y directions, the positioner maintains the angular position of the fiber subassembly relative to the laser subassembly resulting from the angular alignment step.

In step 730, an intermediate part is installed between the fiber subassembly and the laser subassembly. The intermediate part is designed to accommodate the angular and linear positions of the fiber subassembly relative to laser subassembly resulting from the angular and transverse alignment steps. The positioner may be used to adjust the linear position of the fiber subassembly relative to the laser subassembly in the z-direction before installing the intermediate part (e.g., when using brackets 530) or after installing the intermediate part (e.g., when using intermediate part 130). Also, to the extent necessary (as when using brackets 530), springs or other means may be used to hold the intermediate part in place once the desired relative linear position of the fiber subassembly in the z-direction is achieved.

In step 740, the optical components are permanently assembly using YAG welding or any other technically feasible fastening technique. Importantly, the angular and linear positions of the fiber subassembly relative to the laser subassembly resulting from the angular and transverse alignment steps are maintained during the permanent assembly step.

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for assembling optical components, the method comprising:

angularly aligning a fiber subassembly and a laser subassembly to achieve a desired angular position of the fiber subassembly relative to the laser subassembly;

transversely aligning the fiber subassembly and the laser subassembly to achieve a desired linear position of the fiber subassembly relative to the laser subassembly, while substantially maintaining the desired angular position;

installing an intermediate part between the laser subassembly and the fiber subassembly such that a shaped surface on the intermediate part mates with a corresponding shaped surface on the fiber subassembly, whereby the intermediate part is configured to accommodate the desired angular position and the desired linear position and the intermediate part includes an aperture that allows a collimated beam produced by the laser subassembly to pass therethrough; and permanently assembling the fiber subassembly, the laser subassembly and the intermediate part, while substantially maintaining the desired angular position and the desired linear position.

2. The method of claim 1, wherein the step of angularly aligning includes adjusting an angular position of the fiber subassembly relative to the laser subassembly in the $\Theta_x$ and $\Theta_y$ directions.

3. The method of claim 1, wherein the step of angularly aligning includes measuring angular displacements of a collimated beam produced by the fiber subassembly relative to a collimated beam produced by the laser subassembly in the $\Theta_x$ and $\Theta_y$ directions.

4. The method of claim 3, wherein the step of angularly aligning includes adjusting an angular position of the fiber subassembly to the laser subassembly until the angular displacements of the collimated beam produced by the fiber subassembly relative to the collimated beam produced by the laser subassembly in the $\Theta_x$ and $\Theta_y$ directions are substantially zero.

5. The method of claim 1, wherein the step of transversely aligning includes adjusting a linear position of the fiber subassembly relative to the laser subassembly in the x and y directions.

6. The method of claim 1, wherein the step of transversely aligning includes measuring optical signal power received by the fiber subassembly from a collimated beam produced by the laser subassembly.

7. The method of claim 6, wherein the step of transversely aligning includes adjusting a linear position of the fiber subassembly relative to the laser subassembly in the x and y directions to maximize the optical signal power received by the fiber subassembly.

8. The method of claim 1, further comprising the step of adjusting a linear position of the fiber subassembly relative to the laser subassembly in the z-direction.

9. The method of claim 1, wherein the intermediate part comprises brackets.

10. The method of claim 9, wherein the step of installing an intermediate part includes using a means to hold the brackets in place.

11. The method of claim 1, wherein the step of permanently assembling includes YAG welding.

12. A system for assembling optical components; the system comprising:
    means for measuring angular displacements of a collimated beam produced by a fiber subassembly relative to a first collimated beam produced by a laser subassembly;
    means for angularly aligning the fiber subassembly and the laser subassembly to achieve a desired angular position of the fiber subassembly relative to the laser subassembly;
    means for measuring optical signal power received by the fiber subassembly from a second collimated beam produced by the laser subassembly;
    means for transversely aligning the fiber subassembly and the laser subassembly to achieve a desired linear position of the fiber subassembly relative to the laser subassembly, while substantially maintaining the desired angular position; and
    means for accommodating the desired linear position and the desired angular position of the fiber subassembly relative to the laser subassembly, wherein the means for accommodating the desired positions comprises an intermediate part disposable between the fiber subassembly and the laser subassembly, the intermediate part having a shaped surface capable of mating with a corresponding shaped surface on the fiber subassembly and the intermediate part having an aperture that allows a collimated beam produced by the laser subassembly to pass therethrough.

13. The system of claim 12, wherein means for measuring angular displacements comprises a beam analyzer.

14. The system of claim 12, wherein means for angularly aligning and means for transversely aligning comprise a positioner.

15. The system of claim 12, wherein means for measuring optical signal power comprises a detector coupled to the fiber subassembly.

16. The system of claim 12, wherein means for measuring angular displacements comprises a beam analyzer configured to measure angular displacements of the collimated beam produced by the fiber subassembly relative to the collimated beam produced by the laser subassembly in the $\Theta_x$ and $\Theta_y$ directions, and means for angularly aligning comprises a positioner configured to adjust an angular position of the fiber subassembly relative to the laser subassembly in the $\Theta_x$ and $\Theta_y$ directions.

17. The system of claim 16, wherein the positioner is configured to adjust the angular position of the fiber subassembly relative to the laser subassembly in the $\Theta_x$ and $\Theta_y$ directions until the angular displacements of the collimated beam produced by the fiber subassembly relative to the collimated beam produced by the laser subassembly in the $\Theta_x$ and $\Theta_y$ directions are substantially zero.

18. The system of claim 12, wherein means for measuring optical signal power comprises a detector coupled to the fiber subassembly, and means for transversely aligning comprises a positioner configured to adjust a linear position of the fiber subassembly relative to the laser subassembly in the x and y directions.

19. The system of claim 18, wherein the positioner is configured to adjust the linear position of the fiber subassembly relative to the laser subassembly in the x and y directions until the optical signal power received by the fiber subassembly is maximized.

20. The system of claim 12, wherein the laser subassembly includes a collimating lens configured to produce the first collimated beam and the second collimated beam.

21. The system of claim 12, wherein the shaped surface is a concave surface and the corresponding shaped surface is a convex surface.

* * * * *